Figure 1:
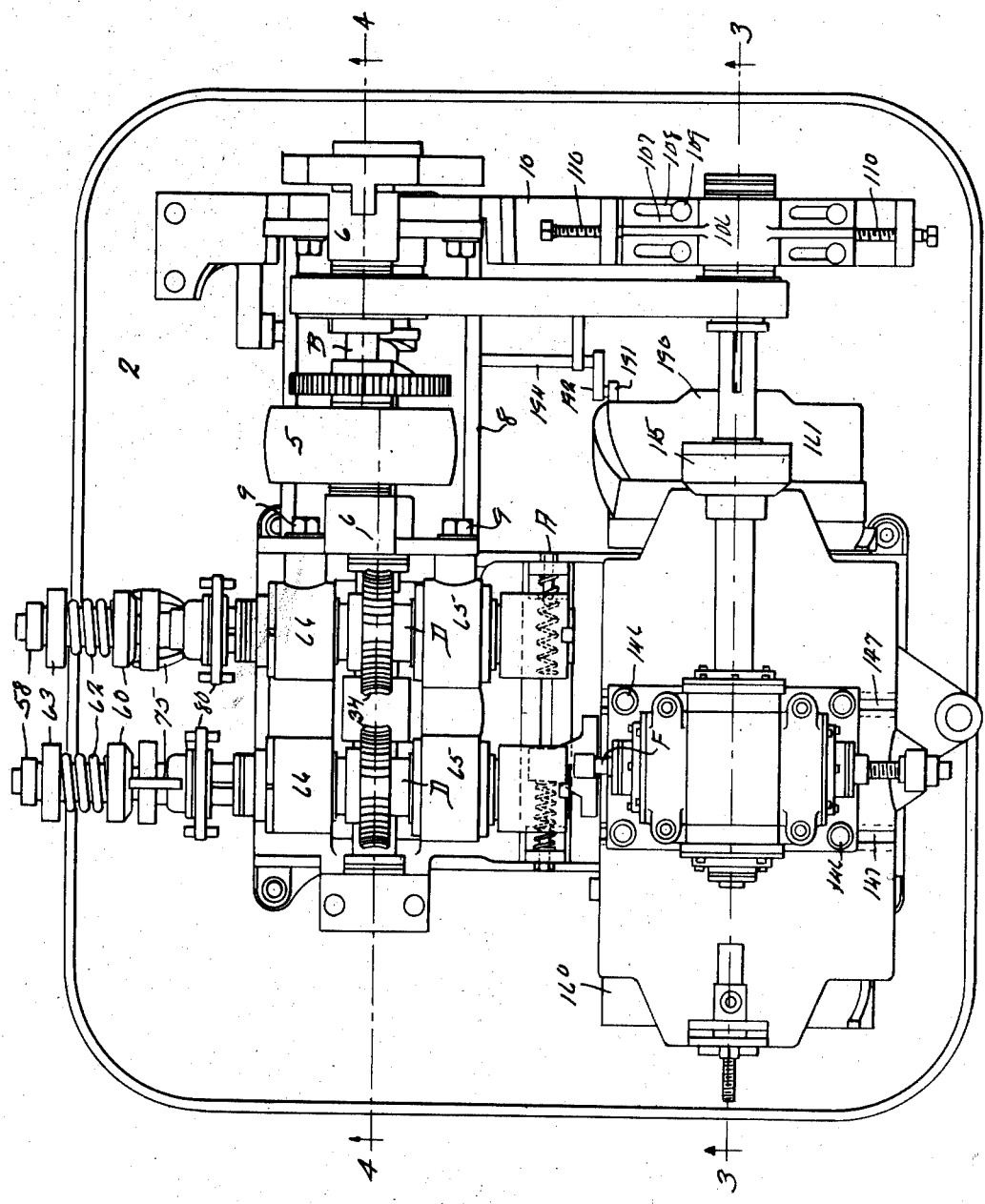

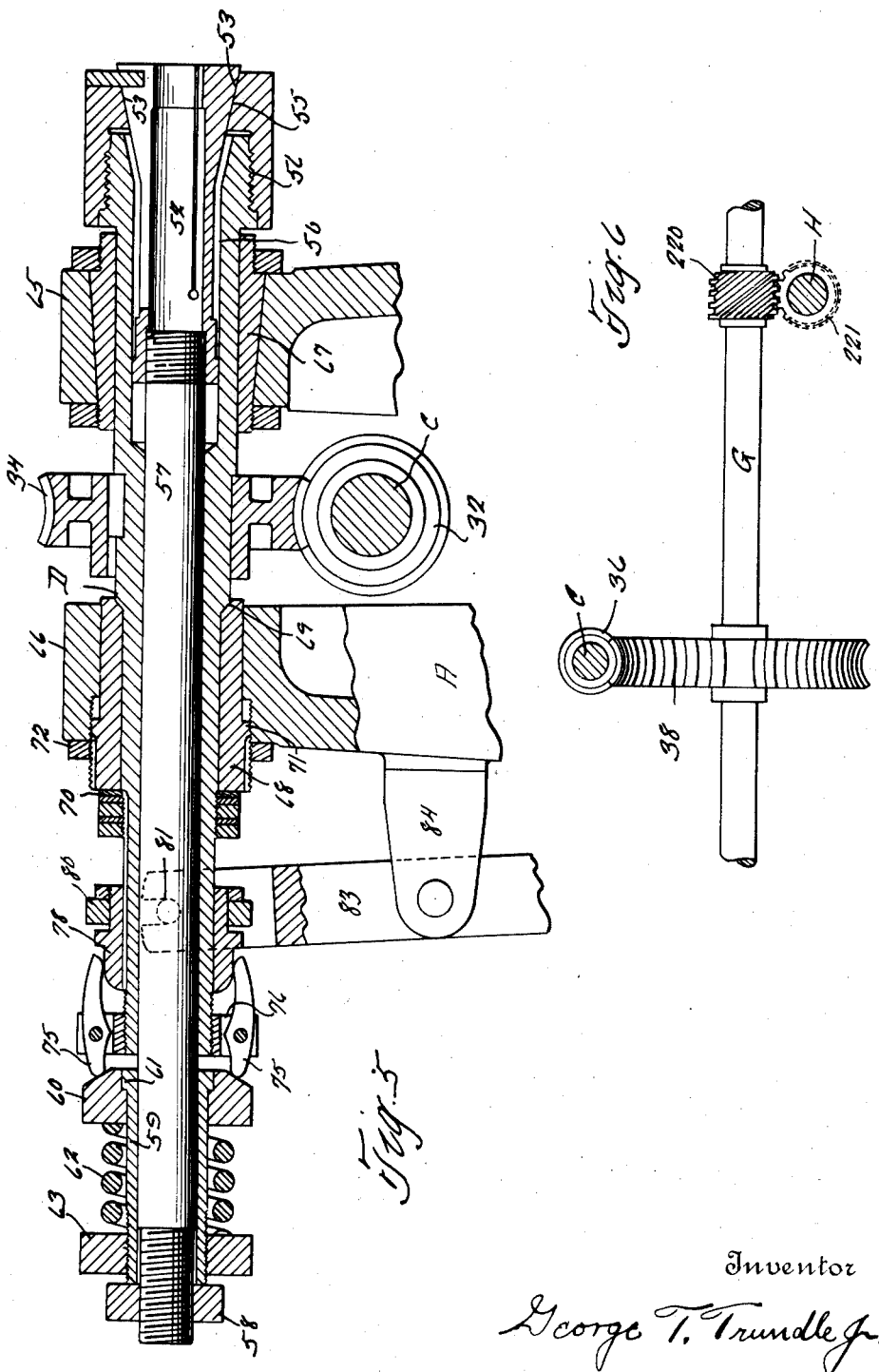

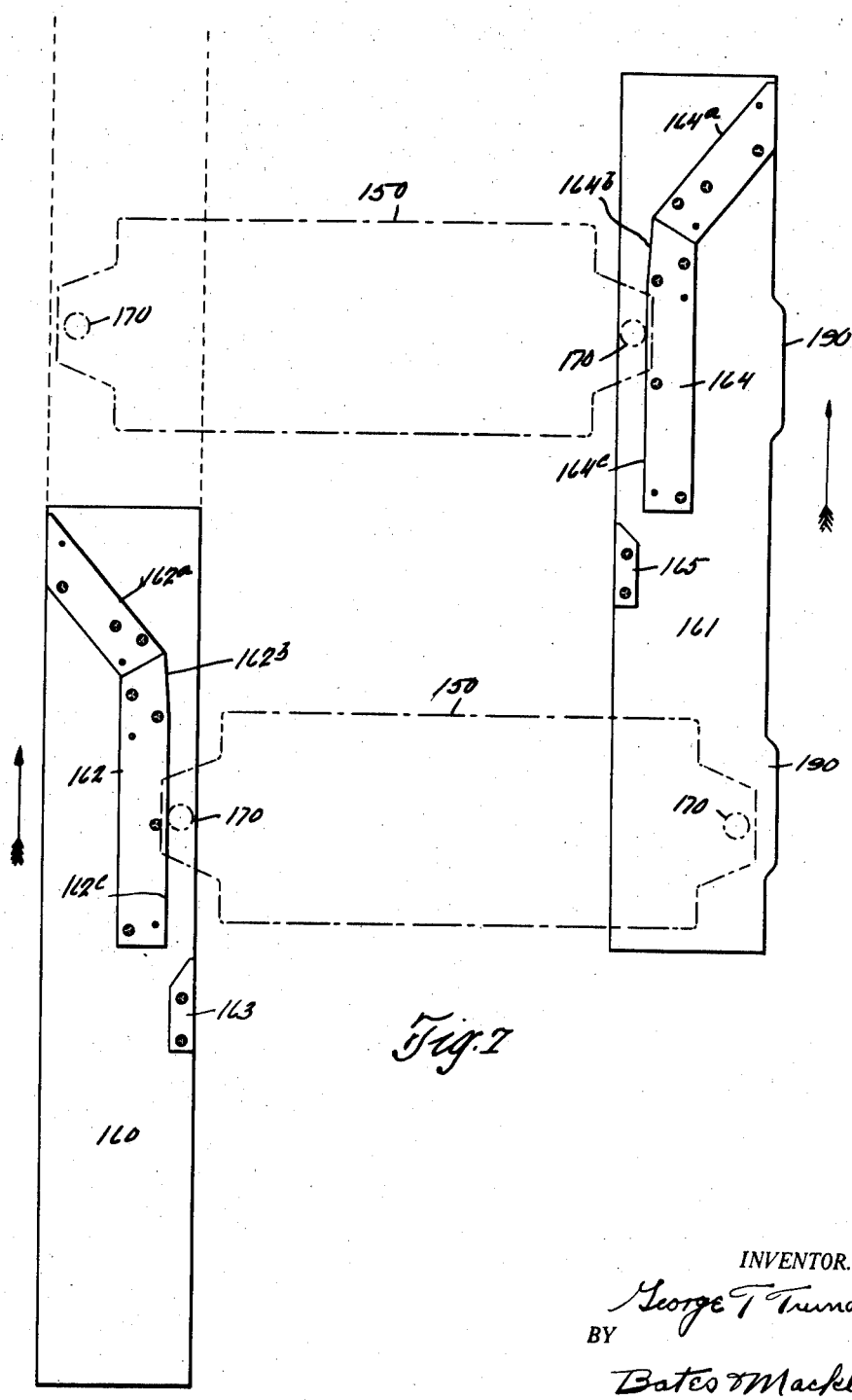

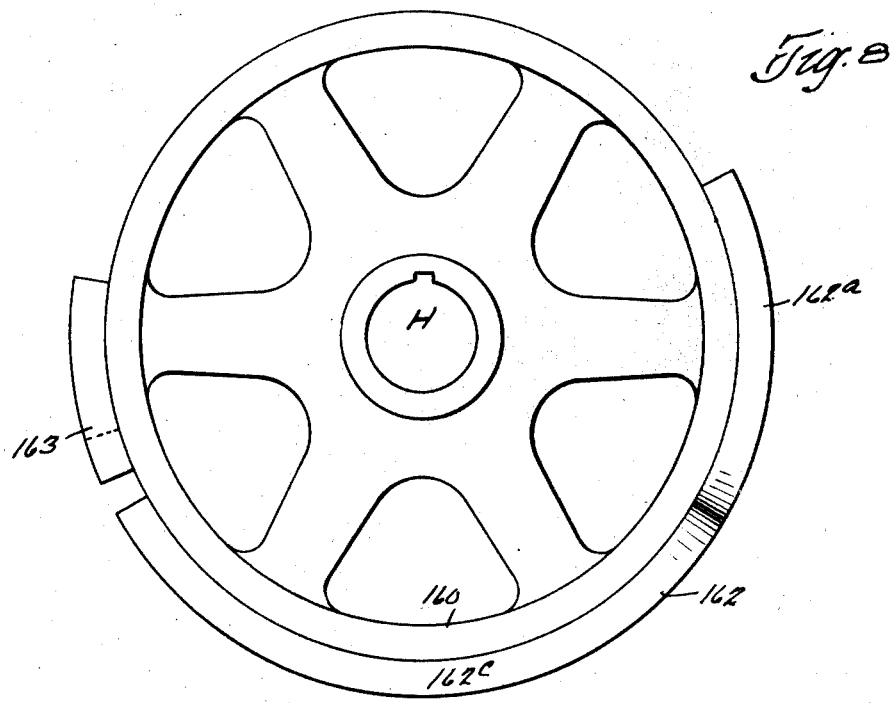
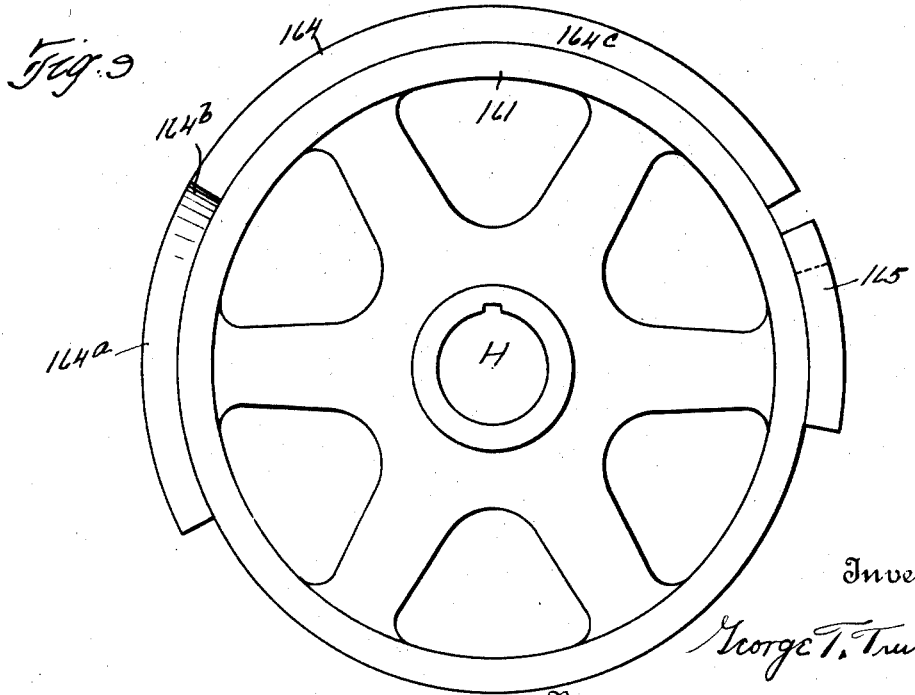

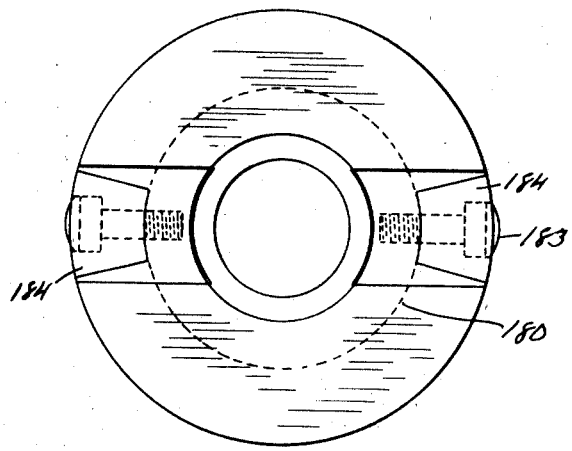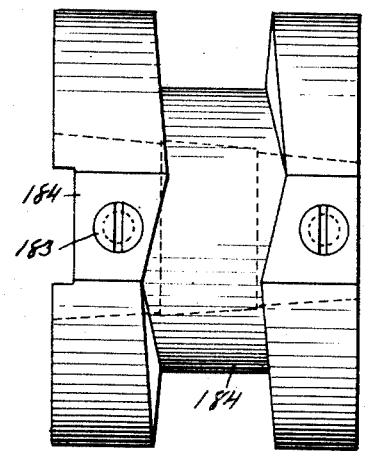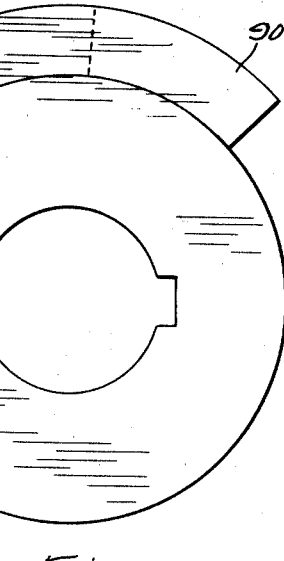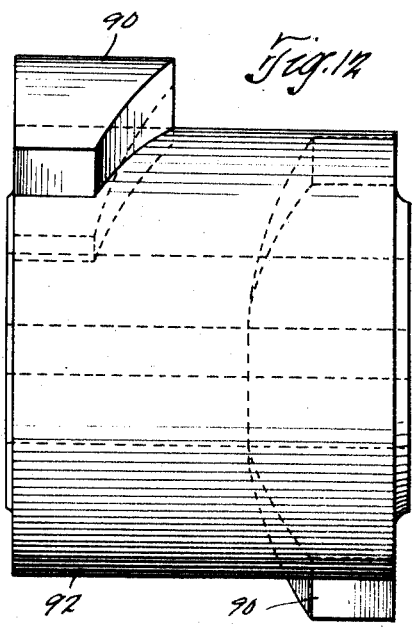

G. T. TRUNDLE, Jr.
MILLING MACHINE.
APPLICATION FILED SEPT. 2, 1919.
1,401,378.
Patented Dec. 27, 1921.
12 SHEETS—SHEET 9.
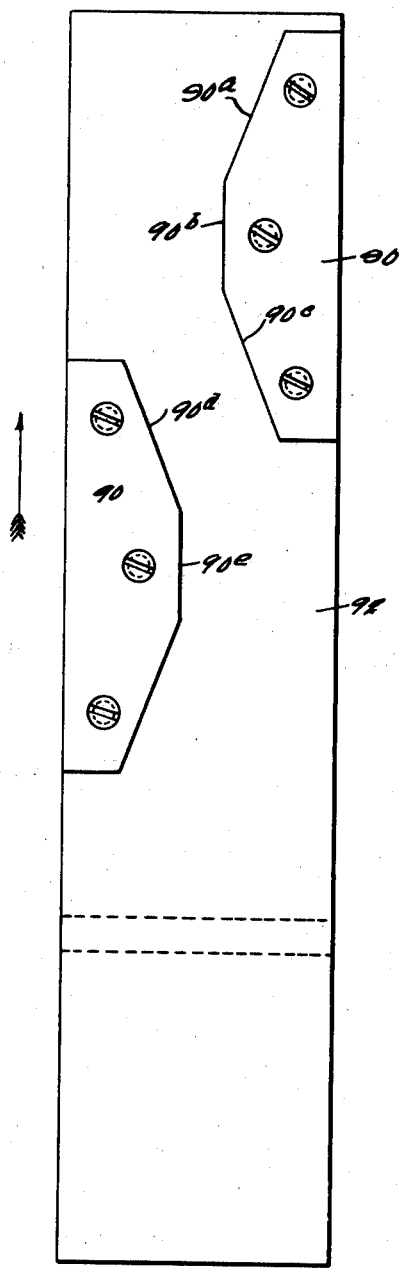
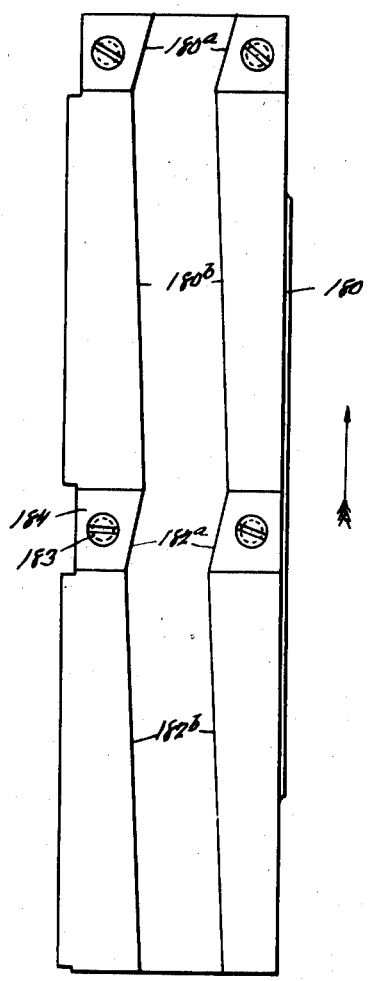
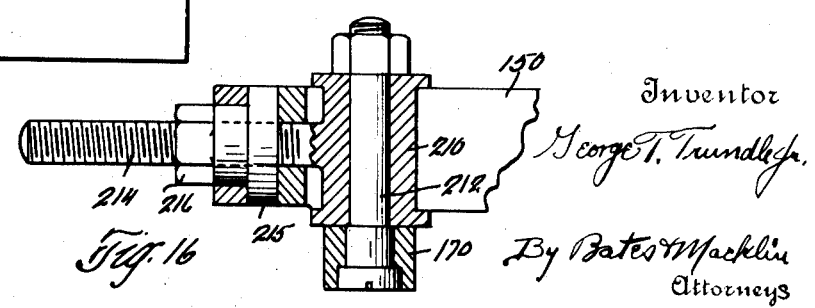
Inventor
George T. Trundle Jr.
By Bates & Macklin
Attorneys

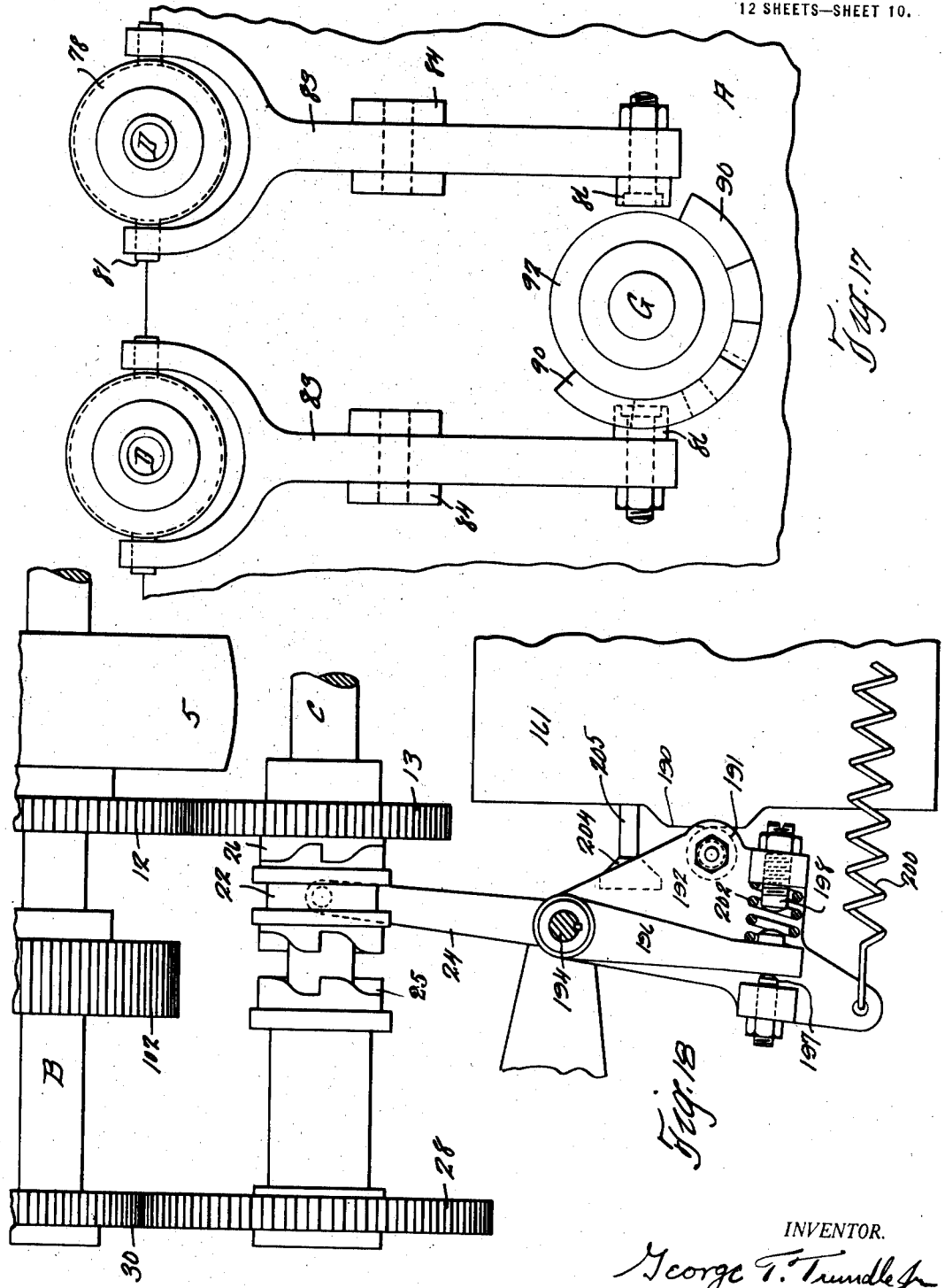

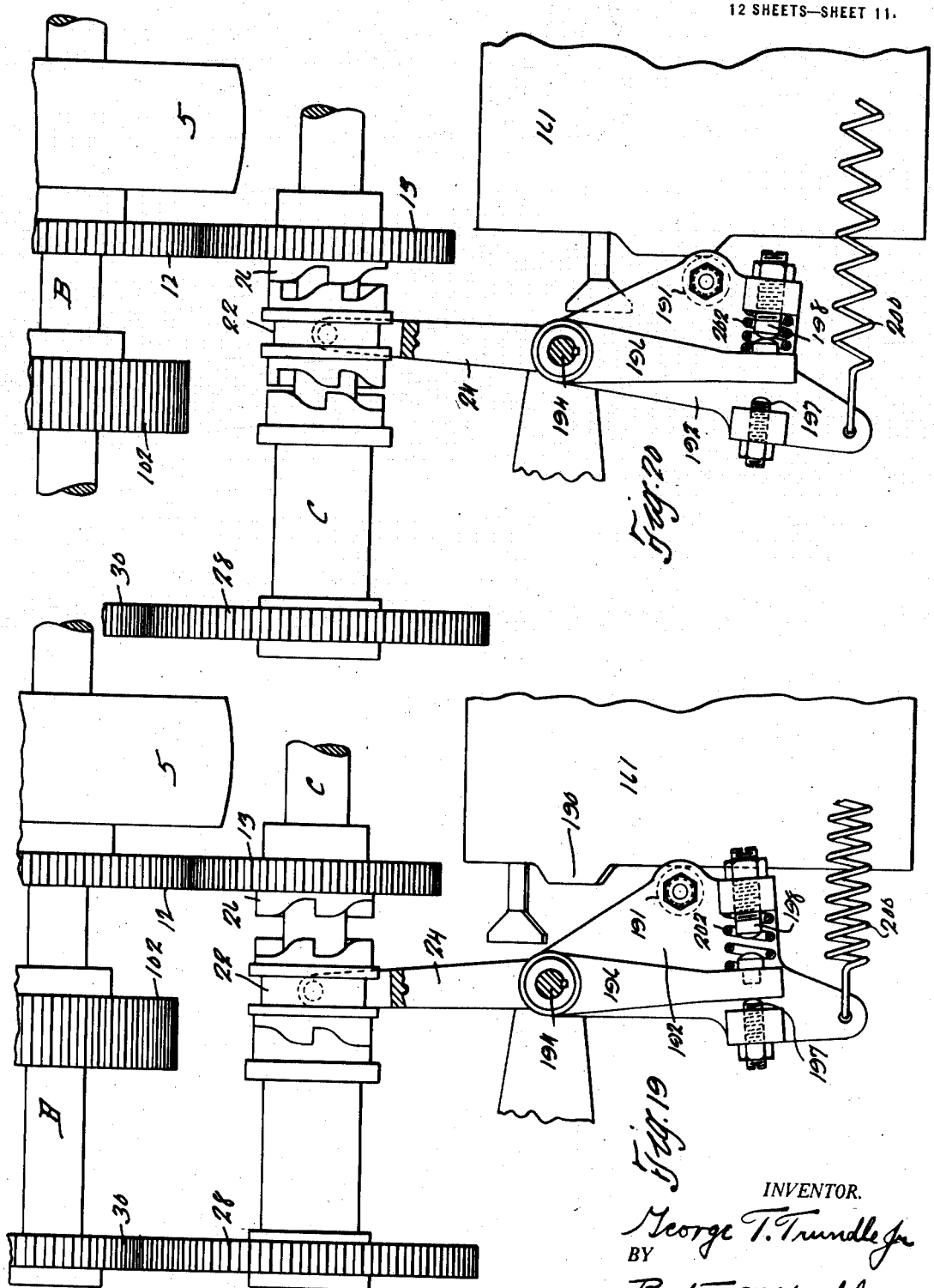

G. T. TRUNDLE, Jr.
MILLING MACHINE.
APPLICATION FILED SEPT. 2, 1919.
1,401,378.
Patented Dec. 27, 1921.
12 SHEETS—SHEET 12.
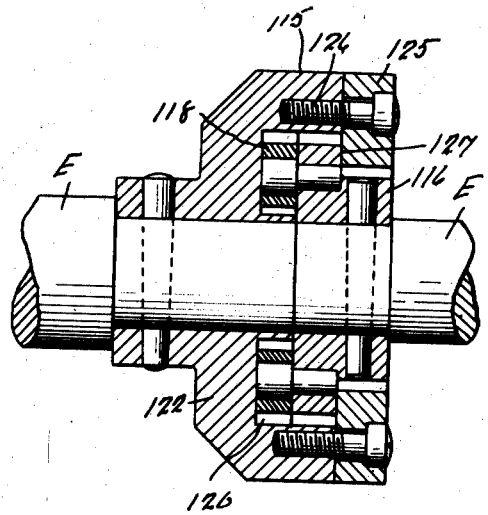
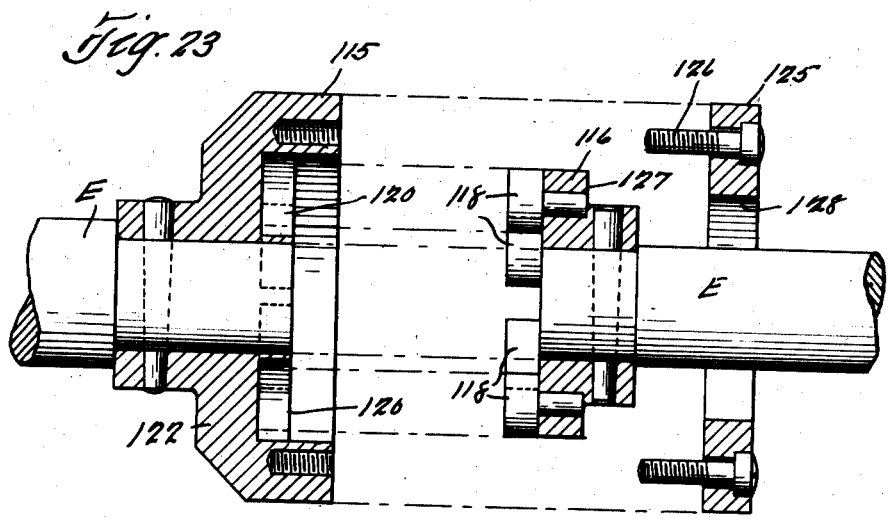
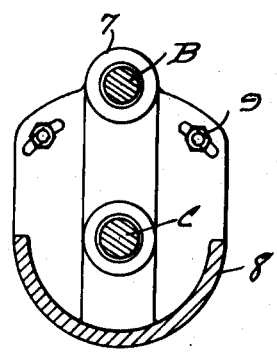
INVENTOR.
George T. Trundle Jr.
BY
Bates & Macklin
ATTORNEYS

UNITED STATES PATENT OFFICE.

GEORGE T. TRUNDLE, JR., OF CLEVELAND HEIGHTS, OHIO, ASSIGNOR TO THE AMERICAN MULTIGRAPH COMPANY, OF CLEVELAND, OHIO, A CORPORATION OF OHIO.

MILLING-MACHINE.

1,401,378.         Specification of Letters Patent.     Patented Dec. 27, 1921.

Application filed September 2, 1919. Serial No. 321,076.

*To all whom it may concern:*

Be it known that I, GEORGE T. TRUNDLE, Jr., a citizen of the United States, residing at Cleveland Heights, in the county of Cuyahoga and State of Ohio, have invented a certain new and useful Improvement in Milling-Machines, of which the following is a full, clear, and exact description, reference being had to the accompanying drawings.

This invention relates to a machine for milling screw threads, the principal object being to provide a mechanism for this purpose which shall very accurately form threads with great rapidity and be largely automatic in its operation. More specific objects are to so construct the machine that it shall be very effective in operation that being comparatively simple in construction and have no parts difficult to manufacture.

Another object is to embody various novel adusting devices whereby the machine shall be capable of milling threads on a large variety of articles of different shapes and sizes.

A preferred embodiment of my invention is designed for milling threads on short plugs or like parts, and such machine comprises essentially a work-holding spindle, cutter carrying and driving mechanism, means for presenting the cutter to the work and for advancing it correspondingly with relation to the pitch of the thread. To attain rapidity of operation the cutter is arranged to be presented alternately to the articles carried by each of the spindles, so that while the cutter is presented to the article on one spindle the other spindle automatically releases the finished piece preparatory to receiving a fresh blank; the time required for manually replacing the blank, to be automatically gripped by the work holder or chuck, very nearly equals the time required for milling the threads on the articles carried by the opposing spindle. Thus a minimum amount of time is wasted and the machine is nearly continuous in its cutting operation.

More specific objects are to provide for a quick movement of the mechanism for shifting the cutter from one spindle to the other, and for properly timing the movement of the active or cutting operations of the cutter.

The present invention is somewhat in the nature of an improvement of the mechanism shown, described and claimed in my prior Patent, No. 1,216,019, granted February 13, 1917, on a thread milling machine.

The drawings illustrate a preferred embodiment of my invention to which the following description relates. Further objects and advantages will become apparent in the description. The essential characteristics of the present invention are summarized in the appended claims.

Figure 2:
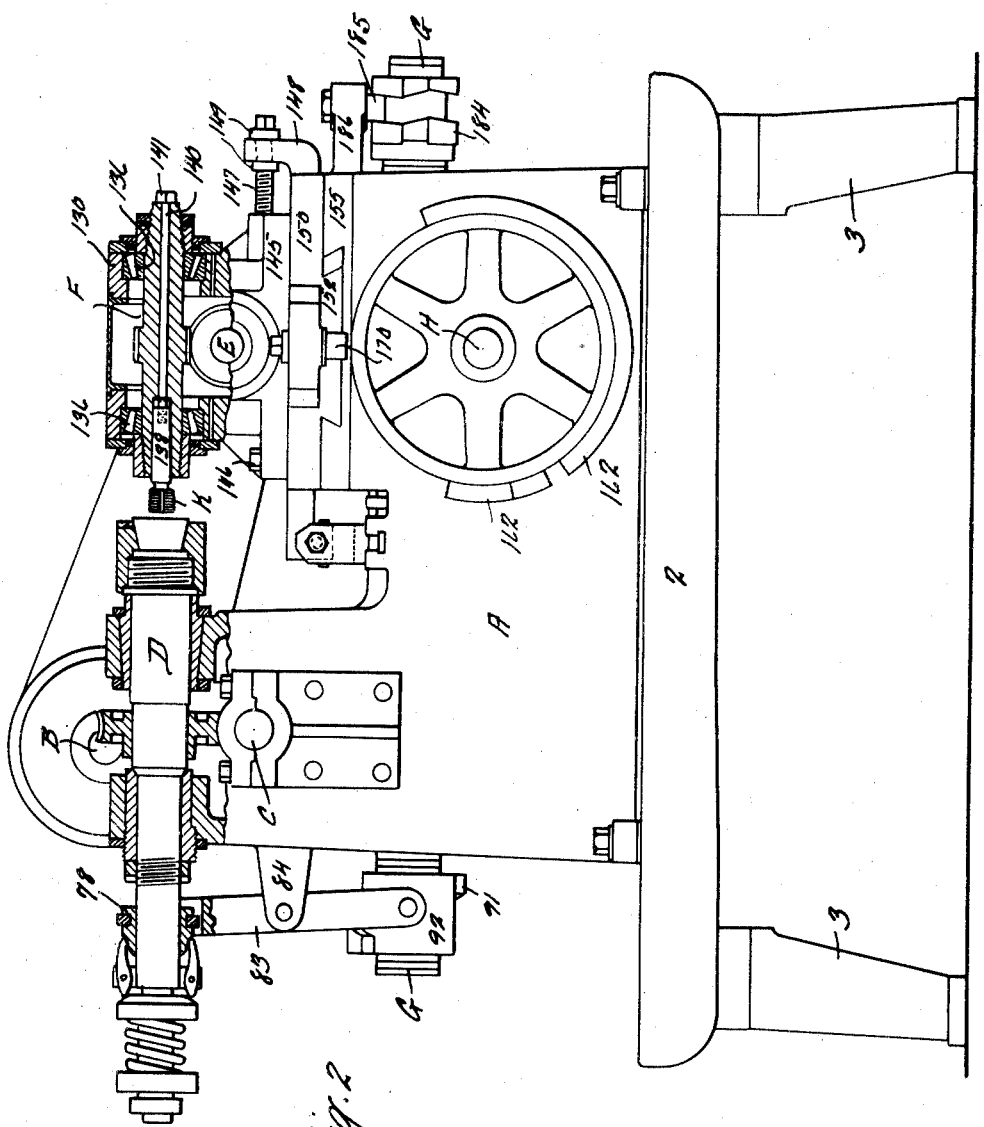
Figure 3:
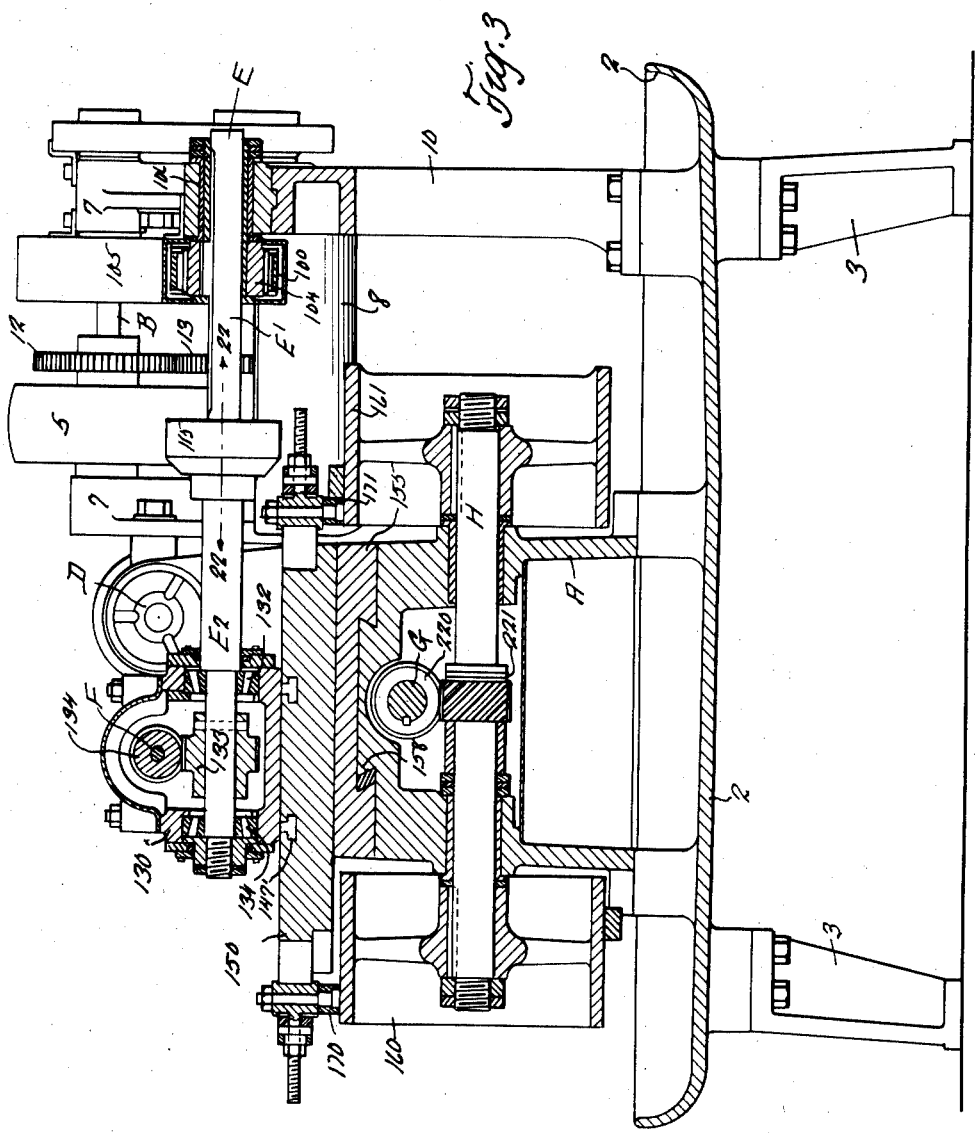
Figure 4:
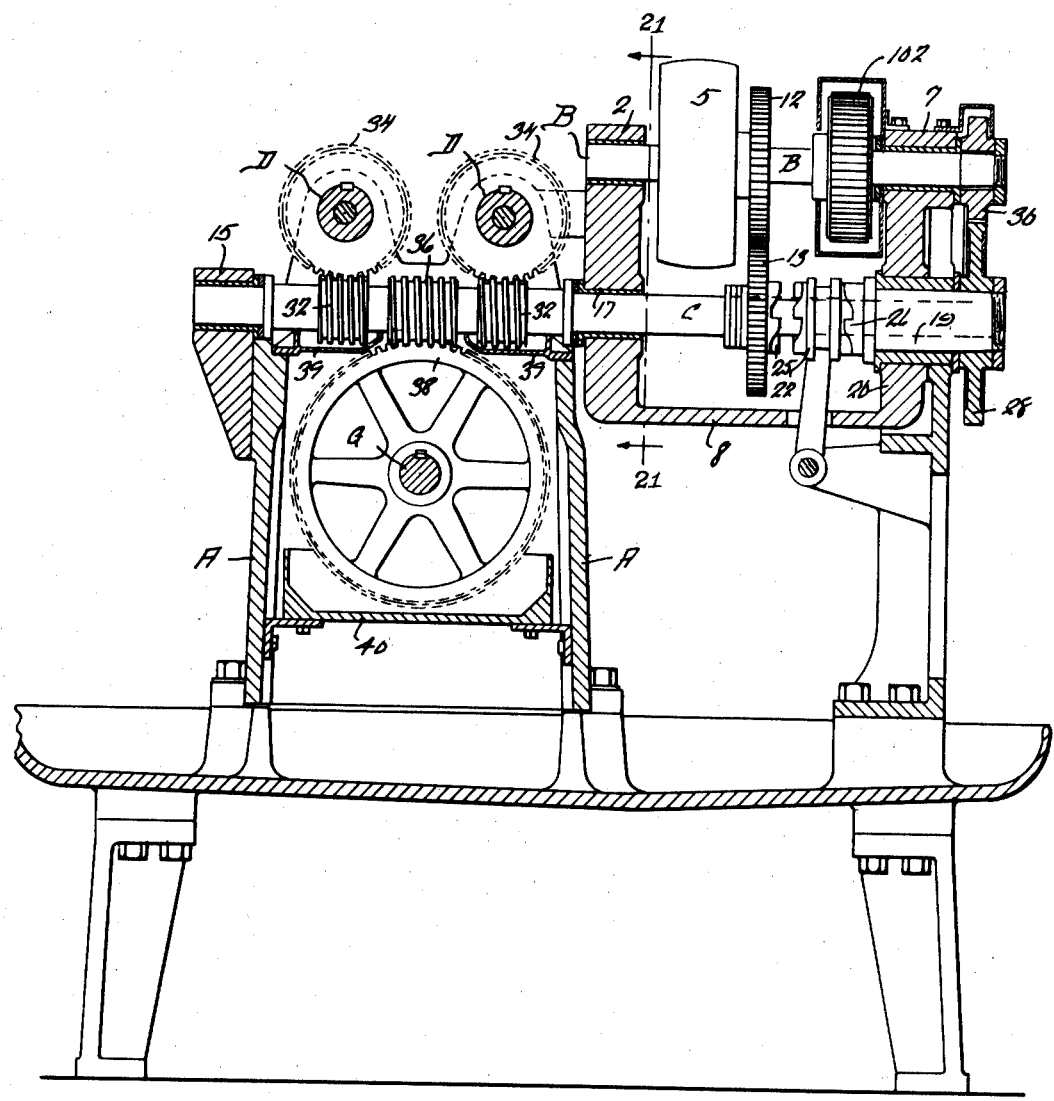

Figure 1 is a plan of the machine; Fig. 2 is a side elevation sectioned along the axes of the cutter and one of the work spindles; Fig. 3 is a vertical section at right angles to Fig. 2 on the line 3—3 of Fig. 1; Fig. 4 is a vertical section parallel with Fig. 3 on the line 4—4 of Fig. 1; Fig. 5 is an enlarged vertical section of one of the work spindles; Fig. 6 is a diagrammatic sectional elevation of the machine shafts, the view being taken on a plane parallel with Fig. 2; Fig. 7 is a diagrammatic view showing the development of the two cams which laterally shift the carriage of the cutter spindle; Figs. 8 and 9 are elevations of the two cams illustrated in Fig. 7, these views showing same in relation to each other; Fig. 10 is a side elevation of the cam which shifts the cutter spindle longitudinally; Fig. 11 is a plan view of this cam; Fig. 12 is a side elevation of the cam which operates the work holding chucks; Fig. 13 is an end view of this cam; Fig. 14 is a development of the cam shown in Figs. 12 and 13; Fig. 15 is a development of the cams shown in Figs. 10 and 11; Fig. 16 is an enlarged detail of the device for mounting an adjusting roller which coacts with the cams shown in Figs. 7, 8 and 9; Fig. 17 is a fragmentary rear elevation of the machine showing the manner in which the cams of Figs. 12, 13 and 14 operate the chucks; Figs. 18, 19 and 20 are elevations of the clutch shifting mechanism in different positions, being in a plane parallel with Fig. 4; Fig. 18, showing the quick return gears engaged by the clutch; Fig. 19 showing the normal driving gears engaged by the clutch; Fig. 20 showing the clutch disengaged but about to engage the quick return gearing; Fig. 21 is a detail illustrating the adjustment of the shaft carrying the drive pulley, being a vertical section as indicated by the line 21—21 on Fig. 4; Fig. 22 is an axial section of a coupling in the mechanism for driving the cutter spindle as indicated by the line 22—22 on Fig. 3; Fig. 23 is an axial section of the parts shown in Fig. 22 separated and ready for assemblage.

The machine comprises essentially a drive shaft B, a spindle drive shaft C, work-carrying spindles D, a cutter spindle drive shaft E, a cutter spindle F, a cam shaft G for advancing the cutter spindle according to the pitch of the thread and for operating the chucks of the work-carrying spindle, a cam shaft H for shifting the cutter spindle from one work-carrying spindle to the other, and suitable mechanism therefor operating these various shafts and spindles, as will be presently described in detail.

The bed, proper, A, is shown as mounted on bosses rising from a suitable drip or oil pan 2, which is in turn supported on legs 3.

The drive shaft B carries a suitable pulley 5 rigid thereon, over which may run a suitable belt for driving mechanism. This shaft is shown as carried in suitable bearings 6, formed integral on an upright end wall 7 of a cradle-like bracket 8, secured to the bed A by bolts as at 9, the other end of the cradle being supported by similar bolts, securing it to an upright bracket 10 arising substantially parallel to the side of the bed A and mounted on suitable bosses extending upwardly from the drip pan 2.

Adjacent to the drive pulley 5 and rigid upon a shaft B is shown a gear 12 meshing with a gear 13 rotatably mounted on the shaft C. The shaft C has a bearing 15 provided in a suitable bracket secured to the bed frame A, and has an intermediate bearing 17 formed in the end wall of the cradle 8, while the opposite end of the shaft extends loosely through a sleeve 19 journaled in a sleeve 20 mounted in the other end wall of the cradle 8. Splined on the shaft C is a dental clutch member 22 having a grooved periphery receiving a roller trunnion carried on a rock arm 24 operated as hereinafter described to bring the teeth of the clutch member longitudinally into engagement with teeth 26 formed on the side of the gear 13 to drive the shaft C at one speed, or to drive the shaft in the same direction at another speed by engaging teeth formed on the end of the member 22, which is in turn driven by a gear 28 rigid on the sleeve and engaging a pinion 30 on the end of the shaft B.

The shaft C carries separated screw worms 32 meshing with the worm wheels 34 rigid on the spindles D whereby these spindles are rotated in the same direction and at the same speed by the shaft C.

Shown as mounted intermediately of the two screw worms 32 is a worm 36 meshing with a worm wheel 38 rigid on the shaft G and inclosed within the bed frame A. The lower side of the gear preferably dips into an oil pan indicated at 40 mounted within the bed frame. The worms 32 and 34 are preferably lubricated by oil in small pans 39 carried by the bed frame so that the worms 32 dip therein.

The spindles D each comprise essentially a hollow shaft having an enlargement at its inner end as indicated at 50, to receive a chuck member comprising a split sleeve 52 having a conical enlargement 53 at its outer end adapted to fit a correspondingly tapered surface formed in a cap 55, threaded at 56 over the exterior of the end of the spindle shaft. The inner end of this chuck sleeve is threaded to an operating plunger rod 57 carrying a nut 58 at its outer end, against which abuts the end of a sleeve 59 carrying a collar 60, held against an enlargement 61 at the inner end of the sleeve by a spring 62 bearing at its opposite end against a nut 63, threaded to a sleeve 59 and providing for adjustment of the spring tension.

The spindle shaft D is carried in bearings 65 and 66 arising from the bed A. The bearing 65 is shown as an adjustable type having a tapered sleeve 67 carrying threaded collars at each side of the bearing member 65, while the bearing 66 has a non-rotatable sleeve 68 having a beveled shoulder 69 meeting a corresponding shoulder on spindle shaft. Against the other end of this sleeve bears a non-friction washer 70 secured by suitable nuts threaded to the shaft D whereby the spindle is prevented from longitudinal play. The bearing sleeve 68 is itself longitudinally adjustable, providing for longitudinal movement of the spindle by the threaded flange 71 engaging threads in an enlarged recess in the bearing member 66, while a suitable lock nut 72 may serve to retain accurately any position given sleeve 68.

To provide for forcible pull on the plunger 57 to draw the chuck member 53 into its tapered surface contracting its outer end into firm engagement with a blank to be operated upon, I provide mechanism between the bearing 66 and the collar 60 as follows: The inner side of the collar 60 is beveled. On this beveled surface bears rounded ends of short levers 75 intermediately pivoted to a collar 76 longitudinally adjustable on the end of the shaft D. The outward movement of the inner end of each lever 75 causes inward movement of the opposite end along the tapered or beveled surface of the corresponding collar 60, forcing the collar 60 rearwardly. To cause this separating of the inner ends of the levers 75, a sliding collar 78 is shown having a rounded surface presented to the rounded ends of the levers, and adapted to be moved toward and away from the levers by means of a ring 80 embracing a collar 78 between the flange members carried thereby, and having trunnions 81 engaging the bifurcated end of the lever 83 pivoted to a suitable bracket 84 carried by the bed A. This lever 83 carries at its lower end a roller 86, adapted to be engaged by a radial cam 90 on the cylindrical cam member 92, rigid on the end of the shaft G. This construction is shown particularly in Figs. 2, 5 and 17. From Fig. 17 it will be noted that there are two of the cam surfaces 90 each adapted to engage the rollers 86 on each of the levers 83, whereby they may longitudinally move them toward and away from the bed to actuate the chucks in the spindles alternately, through the operating mechanism just described.

The shaft E is driven from the shaft B by a chain 100, shown as running over a suitable sprocket 102, rigid on the shaft B and over a similar sprocket 104 on the shaft E. 105 indicates a suitable guard for this chain. The chain is preferably of the well-known silent chain construction.

The shaft E is preferably made of two sections, the section $E^1$ carrying the sprocket 104 having a suitable bearing 106 formed on a block 107 slidable in transverse relation to the shaft on a slide formed on the supporting bracket 10 and capable of adjustment by reason of slots 108 through which extend clamping screws 109, while horizontal screws 110 provide adjustable end stops for securely holding the bearing slide in any position given it.

As the bearing slide 107 is adjusted it is necessary to correspondingly move the gear 102 to retain the proper tension on the sprocket chain 100. This is readily accomplished by swinging the cradle 8 carrying bearings for the shaft B so that the shaft B moves about the center of the shaft C. From Figs. 2, 4 and 21 it will appear that by loosening the screws 9 this cradle may swing about the shaft C moving the shaft B in either direction transversely of its axis, to correspondingly adjust the chain. The gears 12 and 30 move about their respective companions and the cradle is clamped in its new position by tightening the screws 9. This adjustment is to permit positioning the cutter carrying spindle as may be desired for different types of articles to be threaded, allowing movement of the cutter and its spindle toward and away from the work-holding spindles.

To allow the cutter to move as it advances along the thread for a distance equivalent to the pitch of the thread, I prefer to provide a coupling between the two sections of the shaft E as indicated at 115, Figs. 2, 3, 22 and 23. This coupling preferably comprises a head 116 carrying a plurality of rollers 118 rotatable on an axis parallel with the axis of the shaft E. These rollers fit into and are embraced by radial elongated slots 120 in a coupling head 122 rigid on the other shaft section. The two elements of the coupling are secured together by a disk-like ring 125 through which extends bolts 126 engaging a member 122. This ring bears against the radial shoulder 127 on the head 116 while the adjacent cylindrical shoulder on this head fits loosely in the opening 128, on the ring 125. Thus the rotation of shaft section E, at the right, is transmitted to the shaft section, at the left, while allowing relative movement of the axes of the two sections as the cutter spindle is moved longitudinally of its axis.

The shaft section E at the left extends into a suitable gear housing 130, which carries adjustable roller bearings 131 and 132 carrying the shaft section $E^2$ within the housing. Rigidly mounted on this shaft is a spiral gear 133 meshing with a spiral gear 134 on the cutter spindle F, (Figs. 2 and 3) This cutter spindle is shown as mounted above and at right angles to the shaft E and is carried in suitable adjustable bearings 136. The cutter carried by this spindle is preferably of the type having a cutting head indicated at K, integral with the tapered shank 138. A screw 140 is shown as threaded into the inner end of the shank, and as having a head 141 by which it may be turned to draw the cutter shank into a corresponding tapered socket in the spindle, thus removably but securely holding the cutter in place.

The cutter carrying housing is shown as rising from a base 145 adjustably carried on a slide 150 by means of bolts 146 extending into T-head slots 147', extending transversely of the slide 150 and parallel with the axis of the cutter spindle, a screw 147 is threaded into the base 145 and extends rotatably through an ear 148 arising from the slide 150 while collars 149 at each side of this ear prevent longitudinal movement with relation thereto, while causing movement of the base 145 and housing on the slide 150 when the screw is rotated.

The slide 150 has a dove-tailed tongue 152 fitting a corresponding dove-tailed guideway formed in a slide plate 155 embracing a dove-tailed tongue 158 formed on the bed frame A. It will be seen that these two slides 150 and 155 provide for moving the cutter spindle both longitudinally and transversely of its axis.

The movement transversely of the axis of the cutter spindle, which is for the purpose of presenting the cutter K alternately to the work blanks caried by the spindles D, is caused by cams 160 and 161 keyed to the ends of the shaft H. These cams are in the nature of cyindrical drums carrying outwardly projecting ribs 162 and 163, and 164 and 165, respectively, the radial surfaces of which engage depending rollers 170 and 171 carried by lateral projections integral with the slide 150. The contour of these cams is such as to give the desired movement, hereinafter more fully described in connection with developments of these cams, as shown in the drawings.

The movement of the cutter spindle longitudinally of its axis is accomplished by a cylindrical cam 180 having a groove presenting radial surfaces to the roller 185 carried on a lateral projection 186, preferably integral with the slide plate 155. This cam is rigid on the shaft G and as this shaft revolves the movement of the cutter to correspond to the pitch of the thread is accomplished, as will be more fully described in connection with developments of this cam as shown in the drawings.

The movement of the cutter spindle from one work carrying spindle to the other being an idle movement so far as the cutting operation is concerned, is preferably made as quickly as possible. As appears from the above description this movement is caused by the rotation of the shaft H driven by the shaft G in turn driven by the shaft C through the worm and worm gear 36 and 38 respectively. Accordingly to drive this shaft C faster during the idle movement of the cutter the two sets of gears 12 and 13, and 28 and 30 have been provided. Either of these sets of gears may drive the shaft C, as previously described, through the clutch member 22. Accordingly, then, this clutch member 22 is shifted to render the approximate set of gears active correspondingly to the other operations mentioned.

Referring to Figs. 18, 19 and 20, here is shown a projection 190 on the cam drum 161 (these views being taken looking in the direction opposite to that of Fig. 3). This projection acts on a roller 191 carried on a swinging plate 192 pivoted about the shaft 194, which also carries a rock arm 24 actuating the clutch member 22 but rigid on the shaft 194.

The plate 192 is loosely mounted on this shaft while the rock arm 196 rigid with the shaft projects downwardly parallel with the plate 192, and at its lower end extends between the opposing adjustable bumpers 197 and 198. Thus as the cam drum 161 revolves bringing the projection 190 opposite the roller 191, the plate 192 is swung outwardly against the tension of the spring 200 urging the bumper 198 against the corresponding bumper carried by the rock arm 196 and moving the clutch member 22 toward the gear 13. In case the teeth of the clutch members do not mesh readily this movement is not sufficient to bring them into close engagement, as shown, for example, in Fig. 18, but as the teeth are brought into registration, a spring 202 between the bumper 198 and the rock arm 196, completes the movement. As the cam drum continues to revolve an opposing cam 204 carried on the arm 205, rigid at the drum 161, is presented to the roller. This cam presents a beveled surface in such a manner as to move the roller and plate 192 in the opposite direction against the bumper 197 and the arm 196 and moving a clutch member in the opposite direction, bringing the gears 28 and 30 into play, driving the shaft C much more slowly during the cutting operation. The length of the rest portion of the cam projection 190 is sufficient only to cause engagement of the rapidly driving gears for the period required to move the cutter from one work spindle to the other, the remaining portion of the revolution of the cam drum 161 being idle, the roller bearing against the radial surface under the influence of the spring 200.

Referring next to the cams illustrated in the development diagram, Fig. 7 and in the end elevations of Figs. 8 and 9, these figures are for the purpose of illustrating the respective relative positions of the cams and the slide 150, whose motion brings the cutter from one work holder to the other work holder with the cams rotating in the direction shown by the arrows of Fig. 7, and the slide 150 remaining stationary relative to these rotating movements. An abrupt cam surface $164^a$ engages the roller 170 at the right of the slide 150 and moves that slide comparatively quickly longitudinally of itself, which is transversely of the axis of the cutter spindle. This movement is sufficient to bring the cutter out of engagement with the work in one work-spindle and move it substantially to the work blank in te other work spindle. The roller 170 then comes onto a gradually sloping cam surface $164^b$, which surface moves the slide in the same direction slowly to feed the cutter into the work to the proper thread depth.

The surface $164^c$ onto which the roller 170 now comes, holds the cutter against movement transversely with its axis for a time sufficient for the work spindle to make a complete revolution. During this time the cutter is rotating rapidly and the work completes a revolution so that the thread is completed, the slide 150 remaining stationary during this period except for its advancement longitudinally of the cutter spindle to correspond to the pitch of the thread. The cam surface 164, however, lies in a plane parallel to the axis of the cutter spindle. Accordingly these movements are not incompatible. As the roller 170 passes off from the surface $164^c$ it comes to beveled surfaces of the short cam 165 on the drum 161, while at the same time the roller 170 at the other end of the slide 150 comes on to a correspondingly sloping surface $162^a$ so that for a moment both rollers 170 are engaged to start the slide 150 back on its return movement, which is continued by the surface 162ᵃ until it comes on to a gradually sloping surface 162ᵇ which moves the slide 150 to feed the cutter comparatively slowly into work carried by the spindle toward which the cutter was moved by the cam 164ᵃ, passing off from this surface 162ᵇ. The roller 170 now comes on to the rest portion of the cam 162ᶜ which is also in a plane parallel to the axis of the cutter, whereby the cutter spindle may move corresponding to the pitch of the thread, while being held in the proper axial position to complete the milling of the thread.

Next the roller comes on to a beveled surface of the short cam 163 and at the same time the opposite roller 170 comes on to the cam surface 164ᵃ; thus both rollers are engaged to start a quick return of the slide and a movement continued by the cam 164, as previously described. It will be noted that both of these movements are the quick return movements above described in connection with the shifting of the clutch member 22 to change the speed of rotation on the cam shaft C, and as described, this change is accomplished by cam surfaces 190 which are shown in the cam 161 in their positions relative to the other movements, as will appear from the arrangement of the mechanism described.

It is very necessary that the movements described as caused by the cams in Figs. 7, 8 and 9, shall be very accurate. It is also desirable that for different sizes of work and for the use of different characters or multiple thread milling cutters, that the rollers 170 should be adjustable with relation to the slide 150 and the cutter spindle. Accordingly, I have illustrated in Fig. 16 detail of a suitable adjustment for this purpose. The slide 150 is slotted to receive a block 210 receiving bearing spindle 212 for the roller 170. To move this block within its slot, I have shown an outwardly projecting screw 214 extending through a guide 215 against which bears a nut 216 threaded on the screw 214. To accomplish the adjustment of and securely hold the block 210 and roller 170 in various positions with relation to the slide 150, a similar adjusting device may be used for the roller engaging the cam 180.

The shaft G drives the shaft H at exactly the same speed so that for one revolution of the shaft G the shaft H is caused to make a corresponding revolution by "one to one" spiral gears 220 and 221 rigid on the shafts G and H respectively. Accordingly the cam which moves the cutter spindle longitudinally of its axis has two angular zones for shifting the cutter in one direction abruptly and two corresponding zones for moving it gradually in the other direction. Fig. 15 is a development of the cam surfaces on the drum 180 showing the parallel surfaces 180ᵃ for causing the abrupt return of the cutter spindle after it has been moved outwardly during the cutting operation away from the work spindle the distance of one thread and it will be seen that the time occupied for this abrupt return equals the time occupied for the return of the slide 150 by either the cam surfaces 164ᵃ or 162ᵃ as above described, and the action of these cams 180ᵃ 164ᵃ or 162ᵃ may be simultaneous. The surface 180ᵇ corresponds to the gradual feed or progress of the cutter to give the proper thread pitch, and the angular space occupied by surface 180ᵇ is such that the operation of these surfaces on the roller 185 is simultaneous with that of the "rest" surfaces of cam surface 164ᶜ. Surfaces 182ᵃ and 182ᵇ are duplicates of those just described and may correspond in operation and in time to surfaces 162ᵃ and 162ᶜ. The short surfaces 180ᵃ, which are for more abrupt action, are preferably formed by removable blocks of hardened metal shown at 184 as secured by the screws 183, Figs. 10 and 11.

The work holding chucks are opened and closed to receive new work by the cam 92, levers 83 and mechanism previously described. The opening of the chuck for removing the work and replacing a fresh blank in the chuck is accomplished while the cutter is operating on the opposite spidle. Thus the cam 92, just shown as a drum carrying plates 90 forming the cam surfaces, acts first on one of the rollers 86 as the shaft G rotates to open and close the chuck and then on the other roller 86 to open and close the chuck. One of the plates 90 has a beveled surface 90ᵃ (Fig. 14) and a rest surface 90ᵇ which moves the roller outwardly, swinging the upper end of the lever toward the machine, releasing the tension on the chuck and allowing it to open. The roller then comes opposite a cut-away portion 90ᶜ on the cam, while the active surface 90ᵈ on the opposite cam plate moves the roller inwardly, sliding the chuck collar 78 into active engagement with the chuck operating levers. The roller passes off from the rest portion 90ᵉ and awaits the return of the active surface 90ᵃ. A corresponding operation occurs on the opposite roller 86. Thus each roller is allowed to remain at rest while the cutter operates on the work in the chuck.

A brief description of the operation of the entire machine is as follows: A blank to be operated on is placed in one of the chucks, and power applied to the pulley 5 on the shaft B, which drives all the parts as described. The blank to be threaded is then placed in the chuck just opened and the cutter is moved toward it by either of the cam surfaces 164ᵃ and 162ᵃ, and gradually fed into the surface on the blank to the proper depth of thread, the cutter being rotated continuously through the shaft F and gearing thereon. As the work spindle rotates by its gear 34 from the worms on the shaft C the work is turned against the cutter and the cutter is at the same time moved axially of the work and cutter spindle by the surface 180$^b$ or 182$^b$ to give the thread the proper pitch. While this threading operation is going on the opposite chuck is opened by one of the cam surfaces on the cam drum 92, and a blank placed therein and held manually only long enough to allow the chuck to grip it, whereupon when the threading operation at the opposite spindle is completed the cutter is shifted from that spindle to the spindle carrying a fresh blank and at the same time is moved axially of the cutter by the cam 180 a distance corresponding to the thread pitch. Thus the cutter moves in a path as follows: outwardly axially of the cutter and then transversely of the cutter from one spindle to the other and at the same time inwardly and then outwardly axially, and then diagonally inwardly to the opposite work spindle completing its circuit.

Having thus described my invention, what I claim is:

1. In a thread milling machine the combination of a plurality of rotatable chucks, a rotatable cutter, means for moving the cutter into engagement with the stock carried by one chuck and longitudinally of the axis of said stock, thereafter into engagement with the stock of another chuck and longitudinally of its axis, the means for producing motion longitudinally of said chucks including a cam shaft and a cam removably mounted thereon and placed outside of the frame of the machine.

2. In a thread milling machine the combination of a plurality of rotatable chucks, a rotatable cutter, means for moving the cutter into engagement with the stock carried by one chuck and longitudinally of the axis of said stock, thereafter into engagement with the stock of another chuck and longitudinally of its axis, said means including two cam shafts and cams thereon having opposing radial shoulders.

3. In a thread milling machine the combination of a plurality of rotatable chucks, a rotatable cutter, means for moving the cutter into engagement with stock carried by one chuck, then longitudinally of the axis of such stock, then into engagement with stock in another chuck and longitudinally of its axis, said cutter being carried on superimposed slides relatively movable at right angles, and a plurality of cams, each having its axis parallel with the direction of movement of one of the slides and connections between the slides and cams.

4. In a thread milling machine the combination of a plurality of rotatable chucks, a rotatable cutter, means for moving the cutter into engagement with stock carried by one chuck, then longitudinally of the axis of such stock, then into engagement with stock in another chuck longitudinally of its axis, said cutter being carried by surmounting slides relatively movable, and a plurality of cams, each having its axis parallel with the direction of movement of one of the slides and having radial shoulders for actuating the corresponding slide in opposite direction.

5. In a thread milling machine the combination of a plurality of rotatable chucks, a milling cutter, superimposed slides carrying the milling cutter, a cam, a cam shaft and connections between it and one of the slides for shifting the cutter from the stock in one chuck to the stock in another chuck, a cam, a cam shaft and connections between the cam and another slide for shifting the cutter longitudinally of the axis of the stock.

6. In a thread milling machine the combination of a plurality of rotatable chucks, a milling cutter, superimposed slides carrying the milling cutter, a cam, a cam shaft and connections including an adjustable roller between it and one of the slides for shifting the cutter from the stock in one chuck to the stock in another chuck, a cam, a cam shaft and connections between the cam and the other slide for shifting the cutter longitudinally of the axis of the stock.

7. A combination of rotatable work-holding chucks, a rotatable cutter, coacting slides carrying the cutter and means for moving the slides at right angles to each other to present the cutter to the blanks held by the different chucks and move the cutter along such blanks when so presented, said means including a cam shaft parallel with each slide, a cam on each cam shaft and a projection carried by each slide engaged by the cam.

8. In a thread milling machine the combination of a pair of rotatable chucks, a rotatable cutter, coacting slides carrying the cutter, a cam for moving each slide to move the cutter from one chuck to the other and longitudinally of the axis of the cutter, a cam shaft carrying each cam, intermeshing gears on said cam shafts whereby one is driven by the other and at the same speed.

9. In a thread milling machine the combination of a pair of rotatable chucks, a rotatable cutter, coacting slides carrying the cutter, a cam for moving each slide to move the cutter from one chuck to the other and longitudinally of the axis of the cutter, a cam shaft carrying each cam, intermeshing spiral gears on said cam shafts having a one to one ratio.

10. In a thread milling machine the combination of a pair of rotatable chucks, a rotatable cutter longitudinally and laterally movable, surmounting slides carrying the cutter, a shaft, a cam thereon for moving one of the slides, another shaft driven by the first named shaft, a cam carried thereby for moving another of the slides, a driving shaft and gearing connecting it with one of the cam shafts and with the work spindles.

11. In a thread milling machine the combination of a pair of rotatable chucks, a rotatable cutter longitudinally and laterally movable, surmounting slides carrying the cutter, a shaft, a cam thereon for moving one of the slides, another shaft driven by the first, a cam carried thereby for moving another of the slides, a driving shaft and gearing connecting it with one of the cam shafts and with the work spindles and two speed gearing driving said drive shaft.

12. In a thread milling machine the combination of a pair of rotatable chucks, a cam shaft parallel with the chucks, a cam shaft at right angles thereto, a cutter actuated by said cams whereby it may be moved from one chuck to the other and longitudinally thereof, a driving shaft and worm gearing driving said cam shafts and said chucks, a shaft and gearing driving the cutter, and including a loose motion coupling driving the last mentioned shaft, a common drive shaft and drive pulley for actuating the first mentioned gearing and the cutter shaft.

13. In a thread milling machine the combination of a rotatable chuck, a cam shaft parallel with the chuck, a cam shaft at right angles thereto, a cutter actuated by said cam whereby it may be moved transversely and longitudinally of the chuck, means on the first cam shaft for opening and closing the chuck, and a driving shaft and worm gearing for driving said cam shafts and said chuck, a shaft and gearing driving the cutter.

14. In a thread milling machine the combination of a plurality of work-holding spindles, a cutter and cams for shifting the cutter transversely and longitudinally of said spindles, two cam shafts each parallel to one direction of movement of the cutter, and spiral gears connecting the cam shafts whereby one is driven by the other.

15. In a thread milling machine the combination of a plurality of work-holding spindles, a cutter means for shifting the cutter transversely and longitudinally of said spindles, including a shaft parallel to each direction of movement of the cutter, and gears connecting the shafts whereby one is driven by the other and at the same speed.

16. In a thread milling machine the combination of a pair of work-holding spindles, a cutter spindle movable transversely and longitudinally of the work holding spindles, cams and cam shafts therefor for moving the cutter, and shafts and gearing for driving the cutter, a shaft and gearing for driving the work-holding spindles, and a primary driving shaft in said machine connected with the respective shafts and gearing which drive the work-holding spindles, the cutter and the cam shaft.

17. In a thread milling machine the combination of work-holding spindles, a cutter spindle, means for shifting the cutter spindle longitudinally and transversely of the work-holding spindles, a shaft for driving the cutter including a shiftable coupling, and a longitudinally slidable connection, and a driving shaft and gearing connecting it with the work-holding spindles and the cutter driving shaft.

18. In a thread milling machine the combination of a work-holding spindle, a cutter spindle, means for shifting the cutter spindle longitudinally and transversely with relation to the work-holding spindle, a shaft member for driving the cutter and having a fixed relation thereto, and a second shaft member, a shiftable coupling connecting these shaft members, a driving shaft and gearing connecting it with the work-holding spindles and one of the cutter driving shaft members.

19. In a thread milling machine the combination of a pair of work-holding spindles, a cutter spindle, means for shifting the cutter spindle from one work-holding spindle to the other and longitudinally thereof, a shaft for driving the cutter spindle, comprising two sections connected by a coupling permitting relative lateral shifting, a common driving shaft and gearing connecting it with the cutter moving means and cutter driving means and work-spindle driving means.

20. In a thread milling machine the combination of a pair of work-holding spindles, a cutter spindle, means for shifting the cutter spindle from one work-holding spindle to the other and longitudinally thereof, a shaft for driving the cutter spindle, comprising two sections connected by a coupling permitting relative lateral shifting, one of said sections being fixed with relation to the cutter and the other being normally fixed but adjustable transversely of its axis, a common driving shaft and gearing connecting it with all said driving means.

21. In a thread milling machine the combination of a work-holding spindle, a cutter spindle, means for shifting the cutter spindle longitudinally of the work-holding spindle, means for driving the work-holding spindle including a primary driving shaft, a shaft for driving the cutter spindle including a section bodily movable with the cutter, and connections and gearing for driving said shaft from the primary driving shaft, and adapted to allow relative movement of said shafts.

22. In a thread milling machine the combination of a pair of work-holding spindles, a cutter spindle, means for shifting the cutter spindle laterally and longitudinally of the work-holding spindles, means for driving the work-holding spindles including a primary driving shaft, a shaft for driving the cutter spindle including a section bodily movable with the cutter, and means for driving said shaft from the primary driving shaft including a splined connection and a slot and pin coupling.

23. In a thread milling machine the combination of a plurality of work-holding spindles, a milling cutter adapted to cut a plurality of threads simultaneously, a spindle carrying the cutter, means for shifting the spindle from a blank carried by one work-holding spindle to a blank carried by another work-holding spindle and longitudinally thereof, means adjusting the relative position of the cutter spindle and work-holding spindles, a primary driving shaft geared with the work-holding spindles, a shaft bodily movable with the cutter for driving the same, a shaft rigid with relation to the work spindles, gearing connecting the latter shaft with the primary drive shaft, and a longitudinal slidable driving connection between the shaft actuated by the coupling and said last mentioned gearing.

24. In a thread milling machine the combination of work-holding spindles, a cutter spindle longitudinally and laterally shiftable with relation to work-holding spindles, means for adjusting the relative position of the cutter and work-holding spindles, a primary drive shaft, gearing connecting it with the work spindles and cutter spindle, and means for compensating for said adjustment including a rocking cradle carrying a portion of said gearing and adapted to shift bearings about the axis of coacting shafts.

25. In a milling machine the combination of a work-holding spindle, a cutter spindle coöperating therewith, a shaft and gearing for driving the work-holding spindle, a shaft and gearing for driving the cutter spindle, means for adjusting the cutter transversely of the axis of these shafts, a shaft and gearing for driving the work spindle driving shaft, and means for shifting the axis of the primary drive shaft about the axis of one of the first named shafts to compensate for said adjustment.

26. In a milling machine the combination of a work-holding spindle, a cutter spindle, parallel shafts geared with and driving the spindles, means for adjusting the cutter with relation to the work-holding spindles transversely of the axis of the driving shafts, a primary driving shaft parallel with each of these shafts, gearing connecting the last named shaft with each of the other shafts, and shiftable bearings for the primary driving shaft, and adjustable means carrying said bearings whereby they may be moved about the axis of one of the shafts to compensate for said adjustment.

27. In a milling machine the combination of a cutter spindle, a work-holding spindle, parallel shafts for driving each of these spindles, a primary driving shaft parallel with each of the driving shafts and geared with one of the shafts by direct gearing and with the other shaft by chain gearing, adjustable bearings carrying the primary driving shaft, and means for moving said bearings about the axis of the shaft with which it is connected by direct gearing.

28. In a milling machine the combination of a work-holding spindle, a cutter spindle, a shaft for driving the work-holding spindle, a shaft for driving the cutter spindle, a primary driving shaft geared with each of the other shafts, all of said shafts being parallel, the cutter spindle driving shaft comprising two sections, one bodily movable with the cutter and the other section having a fixed axis, gearing connecting the latter section with the primary driving shaft, gearing connecting the primary driving shaft with the work spindle driving shaft, and adjustable bracket carrying bearings for the primary driving shaft and bodily shiftable about the axis of the work spindle driving shaft.

29. In a milling machine the combination of a work-holding spindle, a cutter spindle, a shaft for driving the work-holding spindle, a shaft for driving the cutter spindle, a primary driving shaft geared with each of the other shafts, all of said shafts being parallel, the cutter spindle driving shaft comprising two sections, one bodily movable with the cutter and the other section having a relatively fixed axis, a bearing bracket for adjusting the latter section to bring it into approximate alinement with the movable section, gearing connecting the latter section with the primary driving shaft, gearing connecting the primary driving shaft with the work spindle driving shaft, and adjustable bracket carrying bearings for the primary driving shaft.

30. In a thread milling machine the combination of a work-holding spindle, a cutter spindle longitudinally adjustable with relation to the work-holding spindle, a primary driving shaft geared with the work-holding spindle, a cutter driving shaft comprising a plurality of sections connected by a coupling permitting movement transversely of the axis of the shaft, a portion of said shaft having a relatively fixed axis adjustable with relation to the primary driving shaft, a slide carrying the bearing for said section and a sprocket chain and gearing connecting the primary driving shaft with the adjustable section.

31. In a thread milling machine the combination of a work holding spindle, a cutter spindle longitudinally adjustable with relation to the work-holding spindle, a primary driving shaft geared with the work-holding spindle, a cutter driving shaft comprising a plurality of sections connected by a coupling permitting relative movement transversely of the axis of the shafts, a portion of said shaft having a relatively fixed axis adjustable with relation to the primary driving shaft, a slide adapted to be clamped in various positions carrying the bearing for said latter section and gearing connecting the primary driving shaft with the adjustable section.

32. In a milling machine the combination of a work-holding spindle, a cutter spindle longitudinally movable with relation to the work-holding spindle, a driving shaft bodily movable with the cutter spindle, a primary driving shaft and a sprocket chain and gearing connecting the primary driving shaft and cutter driving shaft and a shiftable bearing, a slide on which said bearing is mounted movable in a direction parallel with the axis of the cutter.

33. In a milling machine the combination of a plurality of work-holding spindles, a cutter spindle shiftable transversely of and longitudinally to the work spindles, a slide and cams for moving said slide to cause the shifting of the cutter, a cutter carrying housing normally rigid with the slide but adjustably mounted thereon, and means for clamping it in various positions with relation to said slide, and gearing for driving the work spindles and cutter shifting means and for rotating the cutter.

34. In a milling machine, the combination of a plurality of work-holding spindles, a cutter spindle shiftable transversely of and longitudinally to the work spindles, a plurality of superimposed slides, cams for moving said slides to cause the shifting of the cutter, a cutter carrying housing normally rigid with the uppermost slide but adjustably mounted thereon, and means for clamping it in various positions with relation to said slide, and gearing for driving the work spindles and cutter shifting means and for rotating cutter.

35. A combination of rotatable work-holding chucks, a rotatable cutter, coacting slides carrying the cutter, means for moving the slides at right angles to each other, a cutter carrying housing, a shaft at right angles to the cutter spindle, gearing for driving the cutter by said shaft, and means for adjusting the position of the cutter carrying housing on the slide carrying the housing, cams for moving said slides, and adjustable projections carried by the slides coacting with their respective cams, and means for driving the work-holding chucks and cams and cutter spindle.

36. A combination of rotatable work-holding chucks, a rotatable cutter, means for moving the cutter transversely of and longitudinally of the work-holding chucks including superimposed slides carrying the cutter, said means including two speed gears, and clutch mechanism for automatically changing the speed.

37. In a milling machine the combination of a plurality of work-holding spindles, a cutter spindle, means for shifting the cutter spindle from one work-holding spindle to the other and for moving it a comparatively short distance longitudinally of the cutter spindle, said means including two speed gears and chuck mechanism automatically changing the speed to cause a quick movement of the cutter from one spindle to the other and slow movement of the cutter longitudinally of the spindle.

38. In a milling machine the combination of a plurality of work-holding spindles, a cutter spindle shiftable from one work spindle to the other and longitudinally of the cutter spindle, cams for causing such shifting including two speed gearing, a drive shaft therefor, and a clutch controlling said gearing and means actuated by one of said cams for shifting the clutch.

39. In a milling machine the combination of a plurality of work spindles, a cutter spindle, a cam for shifting the cutter from one spindle to another, a driving shaft, two speed gearing connecting the driving shaft with said cam, a clutch controlling said gearing, a rock arm for actuating said clutch and a cam surface on one of the cams for actuating the rock arm.

40. In a milling machine the combination of a plurality of work-holding spindles, a cutter spindle, a shaft geared to the cutter spindle for driving the same, a primary driving shaft, two sets of gears of different ratios connecting the primary driving shaft with the work-holding spindles, said work spindles driving shaft geared to the cutter shifting means, a clutch controlling the two sets of gears, and means for shifting the chuck actuated consequent upon the movement of the cutter.

41. In a milling machine the combination of a pair of work-holding spindles, a cutter spindle movable transversely of the cutter spindles and then longitudinally thereof, means for causing such movement including a two-speed gearing, means for automatically changing the driving connection of said gearing consequent upon the finish of the longitudinal movement of the cutter.

42. In a milling machine the combination of a plurality of work-holding spindles, a shaft at right angles thereto, gearing connecting said shaft with said spindles for driving the same, a cutter spindle longitudinally adjustable with relation to the work spindles and longitudinally shiftable after being adjusted, a primary driving shaft parallel with the first mentioned driving shaft and geared therewith by direct gearing, the gearing connecting said driving shaft with the cutter, bearings for the primary driving shaft, and an adjustable bracket carrying said bearings and movable to shift the bearings about the axis of the work spindle driving shaft.

43. In a thread milling machine, rotating chucks, a frame carrying cutting means, means for producing relative motion between said chucks and frame so as to bring the work in said chucks intermittently into operative relation with cutting means, and means for producing relative motion between the frame and chucks in a direction longitudinally of said chucks when a cutter is in operative relation with the work in a chuck, and means for adjusting the cutting means on said frame.

44. In a thread milling machine, the combination of a plurality of rotatable chucks, a frame carrying rotatable cutting means, means for producing relative longitudinal and lateral motion between said chucks and frame, said means being adapted to cause relative lateral motion to place a cutter in operative relation with the stock in one of said chucks to thereafter cause relative longitudinal motion and form threads in the stock in this chuck, thereafter to cause relative lateral motion to bring the stock and cutter into inoperative position and thereby bring the other chuck into operative relation with a cutter on said frame, thereafter to cause relative longitudinal motion and form a thread on the stock held in this chuck, thereafter to produce relative transverse motion between the chucks and the frame to repeat the operation, and means for adjusting said cutting means on said frame.

45. In a thread milling machine, the combination of a plurality of rotatable chucks having parallel axes, a longitudinally and laterally movable frame carrying rotatable cutting means, means for producing longitudinal and lateral motion of said frame to cause the work in each chuck to be intermittently brought into operative relation with a cutter adapted to operate therewith, while the other chuck is in inoperative position, and means for causing longitudinal motion of the frame when a cutter is in operative relation with the work in a chuck, and means for adjusting said cutting means on said frame.

46. In a thread milling machine, the combination of a plurality of rotatable chucks, a longitudinally and lateral movable frame carrying rotatable cutting means and cams having their axes parallel with the motion to be produced by them for causing said longitudinal and lateral motion of the cutter frame to bring a cutter into operative position with the stock in one of said chucks, to thereafter move said cutter longitudinally of said stock to form threads thereon, thereafter to move said frame laterally to move the cutter away from said stock and to thereby bring the other chuck into operative relation with a cutter on said frame, thereafter to move said frame longitudinally of said stock to form a thread thereon and thereafter to move said carrier transversely of the chucks to repeat the operation.

47. In a thread milling machine, the combination of a plurality of rotatable chucks having parallel axes, a slide movable in a direction transverse to the axes of said chucks, a slide movable in a direction longitudinally of the axes of said chucks, a cutter housing carrying rotatable cutting means and mounted on one of said slides, means for adjusting said housing along said slide and means including cams, for moving each of said slides to bring the stock in one of said chucks into operative relation with a cutter on said frame, thereafter to relatively move said cutter and chuck longitudinally of the chuck to form a thread on the stock held therein, thereafter to move said transverse slide, to relatively move the cutter and chuck into position and to bring the stock in the other chuck into operative position with a cutter on the frame, thereafter to relatively move said cutter and chuck longitudinally of each other to form a thread on the stock and thereafter to move said transverse slide and repeat the operation.

48. In a thread milling machine, the combination of a plurality of rotatable chucks having parallel axes, a slide transversely movable and a slide longitudinally movable relative to the axes of said chucks, a cutter housing carrying rotatable cutting means mounted on one of said slides, means for adjusting said housing along said slide, and means including cams for moving each of said slides to bring the stock in said chucks intermittently into operative relation with cutter means on said frame, to move said cutter means longitudinally of the chuck to provide a thread on the stock held therein, means for producing longitudinal movement of the slide, including a cam shaft having a cam removably mounted thereon outside of the frame of the machine.

In testimony whereof, I hereunto affix my signature.

GEORGE T. TRUNDLE, Jr.